No. 657,725. Patented Sept. 11, 1900.
Z. T. BLACKMAN.
HORSESHOE FASTENING.
(Application filed July 23, 1900.)
(No Model.)
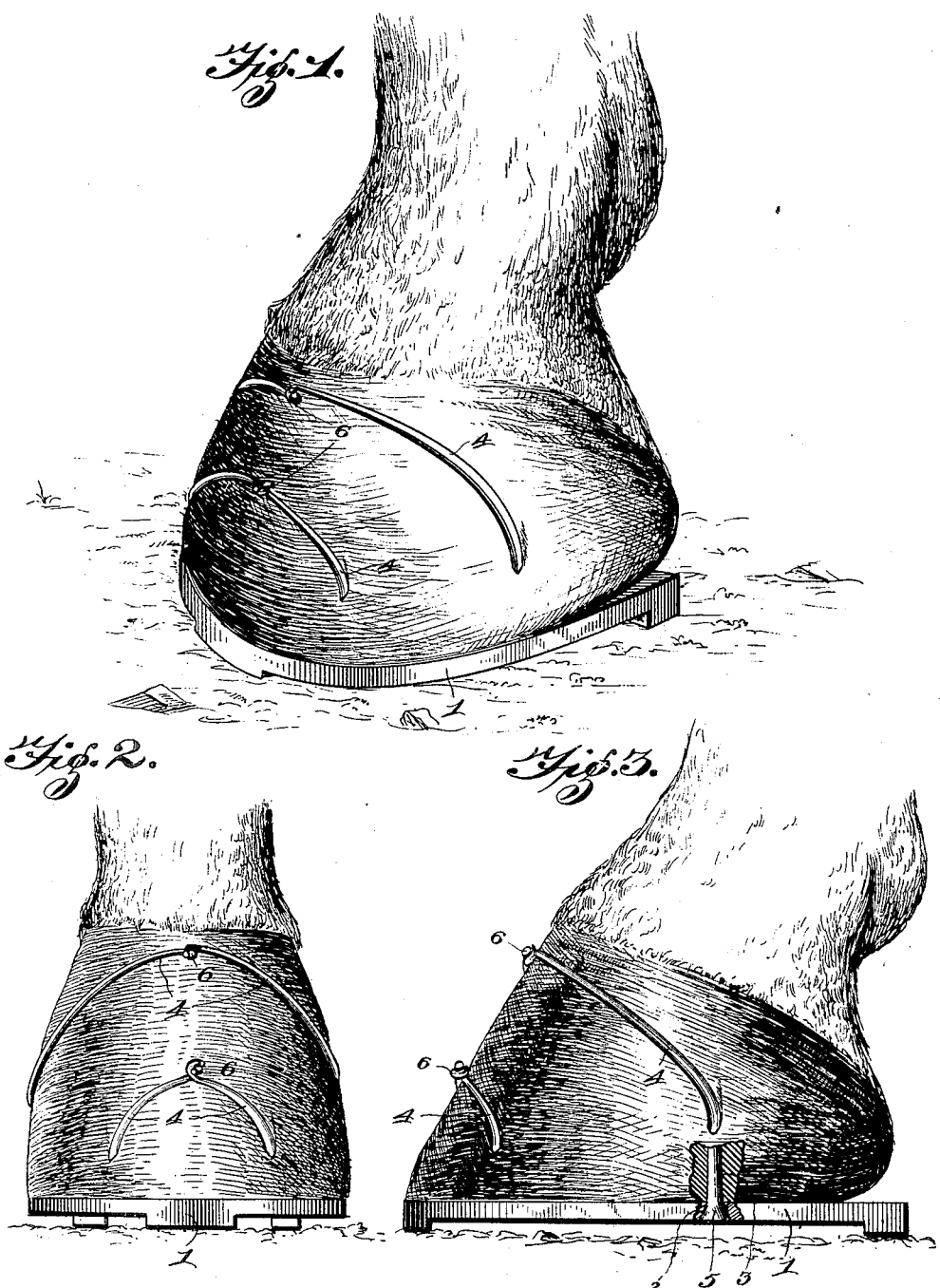

UNITED STATES PATENT OFFICE.

ZACHARY TAYLOR BLACKMAN, OF FLORALA, ALABAMA.

HORSESHOE-FASTENING.

SPECIFICATION forming part of Letters Patent No. 657,725, dated September 11, 1900.

Application filed July 23, 1900. Serial No. 24,572. (No model.)

*To all whom it may concern:*

Be it known that I, ZACHARY TAYLOR BLACKMAN, a citizen of the United States, residing at Florala, in the county of Covington and State of Alabama, have invented a new and useful Horseshoe and Fastening Therefor, of which the following is a specification.

My invention is an improved horseshoe and fastening therefor, one object of my invention being to provide a horseshoe and means for fastening the same without defacing the hoof and without risk of injury to the foot of the animal, a further object of my invention being to provide means whereby the horseshoes while fastened securely to the hoof may be readily detached therefrom.

A further object of my invention is to provide an improved fastening by means of which a horseshoe may be very expeditiously secured to a hoof.

My invention consists in the peculiar construction and combination of devices hereinafter fully set forth, and pointed out in the claim.

In the accompanying drawings, Figure 1 is a perspective view of a horseshoe and fastening devices therefor embodying my improvements, showing the same secured on a hoof. Fig. 2 is a front elevation of the same. Fig. 3 is a side elevation of the same, partly in section.

My improved horseshoe 1 is provided on each side with two or more openings 2, which openings are countersunk on their lower sides.

In securing one of my horseshoes on the hoof of an animal the same is fitted thereto, my horseshoes being manufactured of varying sizes, so that they are adapted to fit hoofs which vary in size, and openings 3 are made through the sides of the hoof by means of a gimlet or other suitable tool, the said openings 3 coinciding with the openings 2 in the shoe. Wire nails 4 are then passed through said openings 2 3 and fitted therein, the heads 5 of the wire nails fitting in the countersunk openings 2 in the shoe, and the wire nails are bent forward around the front portion of the hoof and their ends drawn together in pairs to form bands which are disposed perpendicularly to the hoof, the ends of the pairs of nails being twisted together, as at 6, thereby firmly securing the shoe on the hoof.

It will be understood that by my improved fastening devices all danger of injury to the hoof in attaching the shoe thereto is obviated, and, furthermore, that the hoof is not defaced nor the edges thereof broken. Furthermore, by means of my improved fastening devices the shoe may be secured to the hoof in a very few minutes.

In order to remove the shoe from the hoof, it is only necessary to untwist the ends of the nails, when the shoe may be readily drawn from the hoof by a pair of farrier's tongs, as will be readily understood.

The wire nails which form the fastening-bands taper toward their points to facilitate the bending thereof around the front side of the hoof and to enable their ends to be the more readily drawn and twisted together.

Having thus described my invention, I claim—

A horseshoe having countersunk openings, and fastening-bands composed of wire nails having their heads in said countersunk openings, the said wire nails being passed through openings in the sides of the hoof, bent forward, and having their ends drawn and twisted together, substantially as described.

In testimony that I claim the foregoing as my own I have hereto affixed my signature in the presence of two witnesses.

ZACHARY TAYLOR BLACKMAN.

Witnesses:
E. H. WEEKS,
S. E. HART.